United States Patent
Tsukamoto

(10) Patent No.: US 7,580,056 B2
(45) Date of Patent: Aug. 25, 2009

(54) DIGITAL STILL CAMERA

(75) Inventor: Toshikatsu Tsukamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 638 days.

(21) Appl. No.: 11/204,103

(22) Filed: Aug. 16, 2005

(65) Prior Publication Data

US 2006/0038912 A1    Feb. 23, 2006

(30) Foreign Application Priority Data

Aug. 17, 2004    (JP)    ............................ 2004-237713

(51) Int. Cl.
*H04N 5/225*    (2006.01)
*G03B 13/00*    (2006.01)

(52) U.S. Cl. .................. 348/207.99; 348/375; 348/345
(58) Field of Classification Search .................. 348/362, 348/345, 374; 396/263, 89
See application file for complete search history.

(56) References Cited

U.S. PATENT DOCUMENTS

2004/0095505 A1*    5/2004    Gotanda ..................... 348/370

FOREIGN PATENT DOCUMENTS

| JP | 07-028149 | 1/1995 |
|----|-----------|--------|
| JP | 07-301840 | 11/1995 |

* cited by examiner

*Primary Examiner*—Tuan V Ho
*Assistant Examiner*—Euel K Cowan
(74) *Attorney, Agent, or Firm*—Crowell & Moring LLP

(57) ABSTRACT

It is aimed to provide a small and lightweight digital still camera capable of reducing the possibility of moving the digital still camera while an image is taken due to an operation for pressing a shutter switch by a user. Thus, a single-stage switch which is turned on when the user presses up to a predetermined stroke with his/her finger and is turned off when the user takes his/her finger off is used as the shutter switch. In the normal imaging mode, in a state where the shutter switch is turned on by the user, an image for monitoring is taken at a predetermined interval and the image is displayed on the display device as an electronic view finder using image data output from the imaging device. When the shutter switch is turned off, an image for recording is taken, the obtained image data is recorded in the memory card and the taken image is displayed on the display device using the image data.

3 Claims, 4 Drawing Sheets

DIGITAL STILL CAMERA

BACKGROUND OF THE INVENTION

1. Field of the Invention

The present invention relates to the prevention of slight movement of a digital still camera when a picture is taken.

2. Description of the Related Art

Various methods have been conventionally proposed to prevent the slight movement of a still camera while a picture is taken. Japanese Laid-Open Patent Publication No. 7-301840, for example, describes a method for preventing the slight movement of the camera because a user does not hold the still camera steady. A sensor for sensing the movement of the still camera and a movement correction mechanism are provided in the still camera and to correct the direction and amount of the movement of the still camera sensed by the sensor. Some devices of an optical system are moved in the reverse direction of the slight movement of the still camera, thereby allowing a light beam to reach the same position on a film or an imaging device during the exposure.

Japanese Laid-Open Patent Publication No. 7-28149 describes a single-lens reflex camera/in which a mirror and a shutter are driven by using respective independent drive mechanisms so as to reduce shock at the time of operation of the mirror and the shutter. In a mode for correcting the movement of the camera, driving speed of the mirror and the shutter are decreased to gain a time for attenuating vibration.

However, according to the above-mentioned conventional method, the structure of the still camera becomes complicated, resulting in increase in size and weight as well as costs of the still camera. Thus, it is unrealistic to adopt such a large-scale movement correction mechanism in the digital still camera required to be downsized, light weighted and lowered costs.

SUMMARY OF THE INVENTION

In order to solve the above-mentioned problems, the present invention intends to provide a downsized, light weighted and lowered cost digital still camera capable of reducing the possibility of slight movement thereof caused by movement of the user's hand.

A digital still camera in accordance with an aspect of the present invention comprises an imaging lens, an imaging device arranged so as to be perpendicular to an optical axis of the imaging lens, a focus means for driving the imaging lens in a forward-rearward direction of the optical axis so as to form an image taken by the imaging lens on a light receiving surface of the imaging device, an exposure adjustment means for adjusting an amount of transmitted light of the imaging lens and/or an imaging time of the imaging device depending on the brightness of an object, a storage means for storing an image data taken by the imaging device, a display device for displaying an image taken by the imaging device, a control means for controlling the imaging lens, the imaging device, the focus means, the exposure adjustment means, the storage means and the display device, a flash light-emission means for emitting flash light when a brightness of the object is low, and a shutter switch operated by the user.

The shutter switch is a single-stage switch which is turned on when the user presses up to a predetermined stroke with his/her finger and is turned off when the user takes his/her finger off.

In a state where the shutter switch is turned on, the control means controls the focus means, the exposure adjustment means and the imaging device to take an image for monitoring at regular intervals and displays an image on the display device using image data output from the imaging device, and when the shutter switch is turned off, the control means controls the focus means, the exposure adjustment means, the flash light-emission means and the imaging device to take an image for recording, stores the image data output from the imaging device in the storage means and displays the taken image on the display device using the image data, and when the user takes his/her finger off the shutter switch, the image for recording is taken. Whereby, the possibility of movement of the digital still camera due to the operation of pressing the shutter switch is reduced.

Since the single-stage switch is used as the shutter switch, this digital still camera has a more simplified configuration and can be manufactured at lower costs than the conventional digital cameras having a two-stage switch. Furthermore, since the image for recording is taken when the user takes his/her finger off the shutter switch, the force to rotate the digital still camera around the optical axis of the imaging lens does not work, and thus the possibility of the movement of the digital still camera while the image is taken due to the user's operation of pressing the shutter switch can be reduced. As a result, any special mechanism for prevention or compensating the movement of the digital still camera becomes unnecessary, thereby achieving reduction in size and weight of the digital still camera.

DETAILED DESCRIPTION OF THE EMBODIMENTS

First Embodiment

Figure 1A:
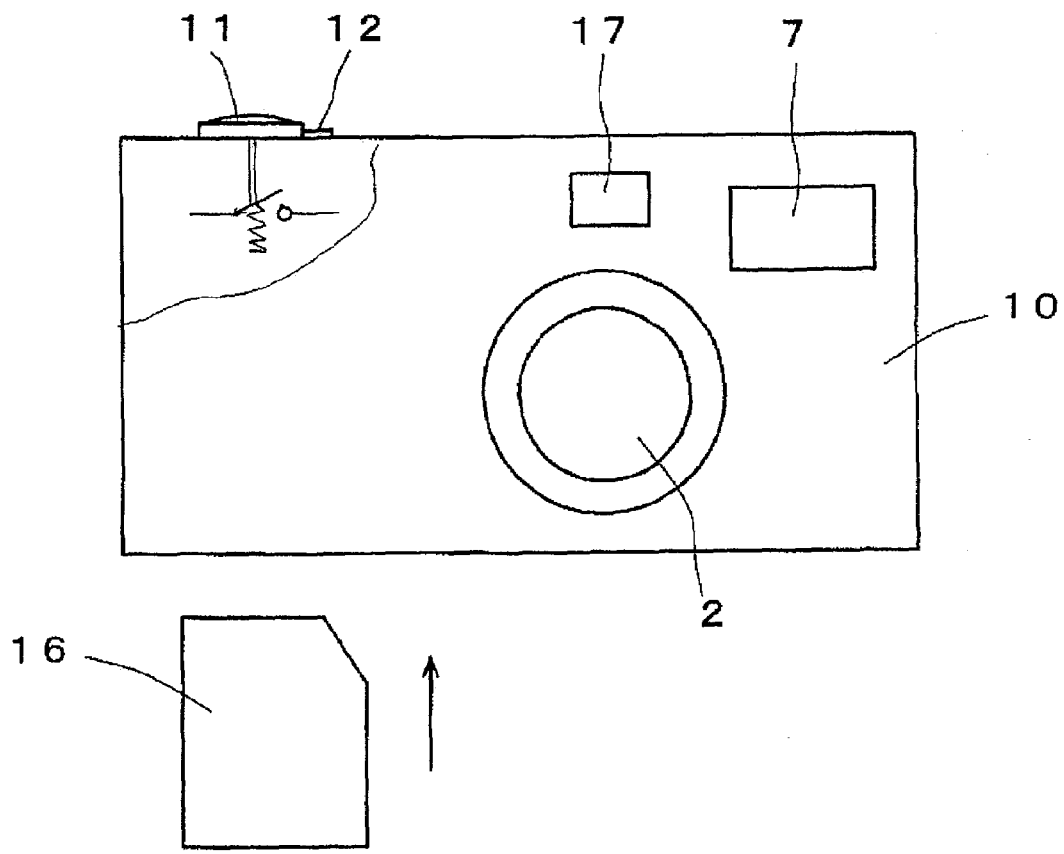
FIG. 1A is a front view showing an external appearance of a digital still camera in accordance with a first embodiment of the present invention.
Figure 1B:
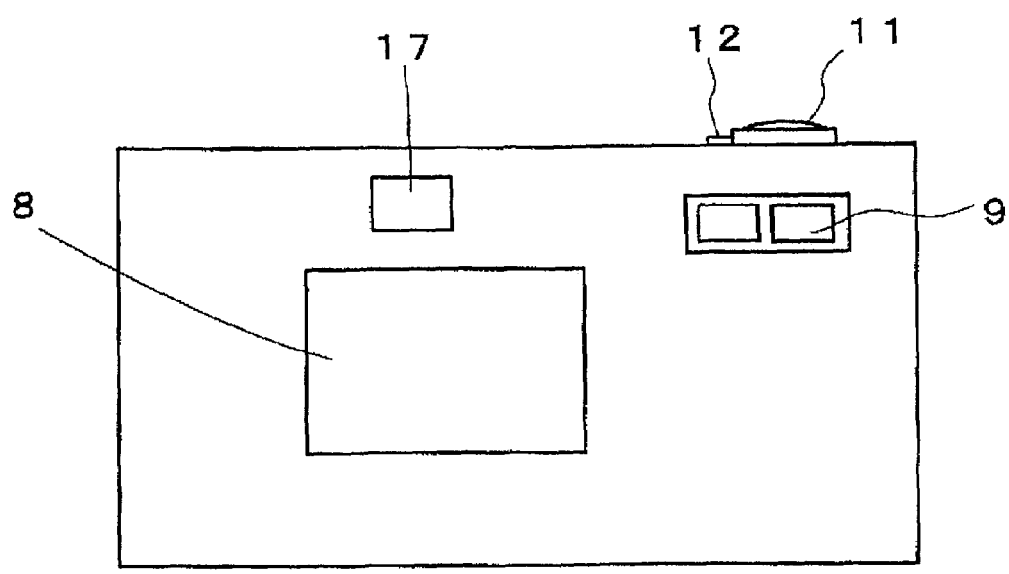
FIG. 1B is a back view of the digital still camera.
Figure 2:
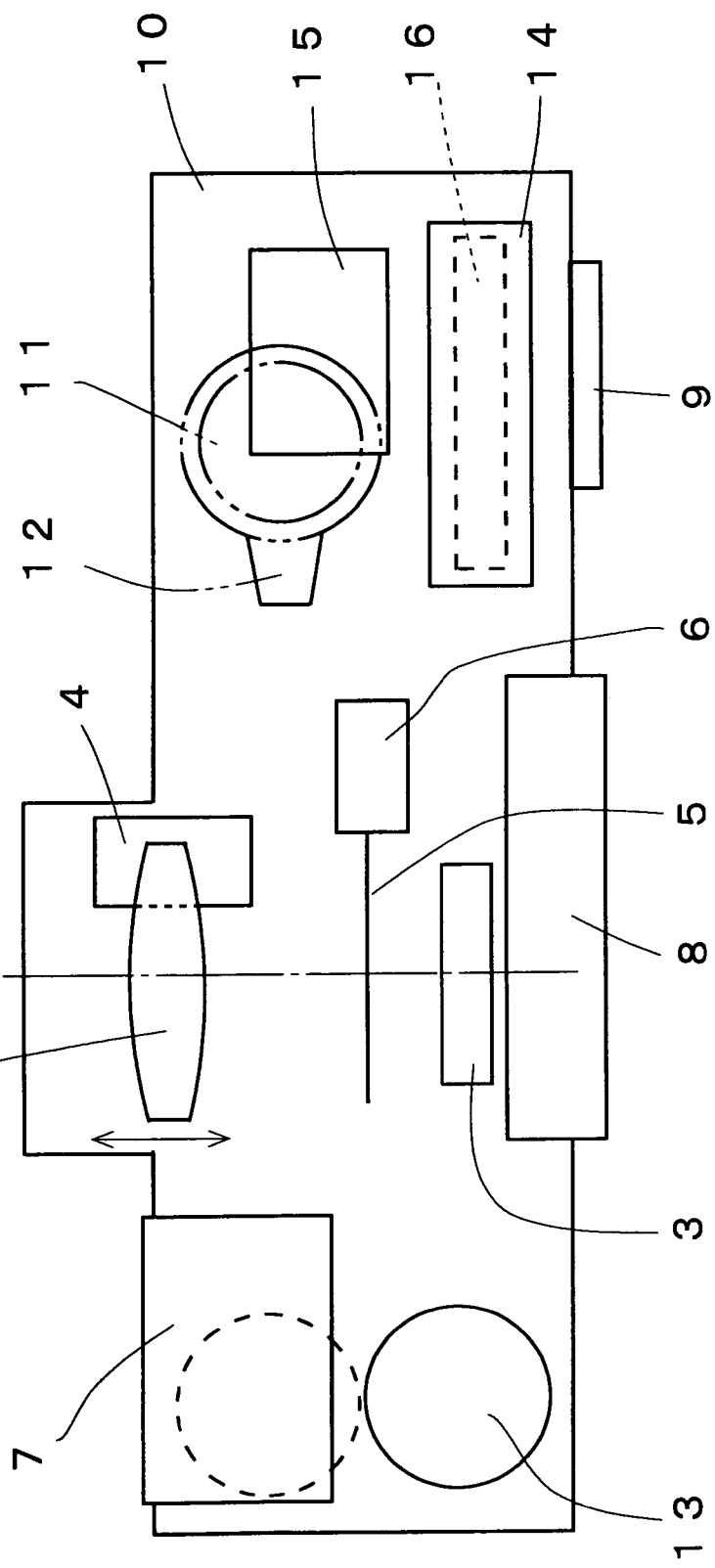
FIG. 2 is a block diagram showing a configuration of the digital still camera.

A digital still camera in accordance with a first embodiment of the present invention will be described below. FIG. 1 shows an external appearance of the digital still camera 1 in accordance with the first embodiment and FIG. 2 shows the block configuration of the digital still camera 1.

When viewed from the front, the digital still camera 1 has an imaging lens 2, such as a zoom lens, arranged at the center of or slightly on the right side of a main body 10, and an imaging device 3, such as CCD or CMOS, arranged so as to be perpendicular to the optical axis of the imaging lens 2. A lens drive mechanism 4 for driving all or a part of optical elements of the imaging lens 2 in the forward-rearward direction of the optical axis is provided in the vicinity of the imaging lens 2. The lens drive mechanism 4 constitutes an automatic focusing (AF) mechanism (focusing means) for forming an image taken by the imaging lens 2 on a light receiving surface of the imaging device 3 along with an AF sensor described later and also serves as a zooming mechanism for changing the focal length of the imaging lens 2. The imaging lens 2 includes an ND filter or diaphragm 5 for adjusting the amount of transmitted light and a light amount adjustment mechanism 6 for driving the ND filter or diaphragm 5 is further provided in the vicinity of the imaging lens 2. The digital still camera 1 has no mechanical shutter mechanism and performs imaging by controlling the imaging device 3.

A flash unit (flash light-emission means) 7 for emitting flash light if necessary is provided in an upper right portion on the front of the main body 10. An optical view finder 17 is provided in the vicinity of the imaging lens 2. A display device 8 such as a liquid crystal display device (LCD) which serves as an electronic view finder and a zoom switch 9 for changing the focal length of the imaging lens 2 are provided on the back face of the main body 10. A shutter switch 11 and a mode changeover switch 12 which rotates around the shutter switch 11 are provided on the top face 10 of the main body 10. A battery 13 which serves as a power supply, a memory card connector 14 for storing data of images taken by the imaging device 3 in a memory card 16 and a control circuit 15 for controlling the whole of the digital still camera 1 are provide within the main body 10. As shown in FIG. 1, for example, the memory card 16 is inserted into the memory card connector 14 from the bottom of the main body 10.

For exposure adjustment, the control circuit 15 controls the light amount adjustment mechanism 6 according to brightness of an object so as to drive the ND filter or diaphragm 5 and to adjust an imaging time of the imaging device 3. Thus, the ND filter or diaphragm 5, the light amount adjustment mechanism 6 and the control circuit 15 serve as exposure adjustment means.

The control circuit 15 comprises a ROM for storing a control program and the like therein, a CPU for executing the control program and the like and a RAM for temporarily storing image data taken by the imaging device 3 and the like therein. For storage of image data, the RAM of the control circuit 15 and the memory card 16 serve as storage means. For electronic view finder function, the control circuit 15 performs decimation on the image data taken by the imaging device 3 and outputs the data subjected to decimation to the display device 8. For exposure adjustment and flash light-emission, the imaging device 3 serves as a sensor for measuring the brightness of the object. When determination is made that the brightness of the object is high and thus flash light is unnecessary, the control circuit 15 controls the ND filter or diaphragm 5 and the imaging time of the imaging device 3 to adjust exposure. Alternatively, when determination is made that the brightness of the object is low and thus the ND filter or diaphragm 5 and imaging time of the imaging device 3 are not enough to adjust exposure, the control circuit 15 controls the flash unit 7 to emit flash light. The flash unit 7 and the control circuit 15 serve as flash light-emission means.

For automatic focusing function, the imaging device 3 serves as the AF sensor. That is, so-called hill-climbing method is adopted in the digital still camera 1 and the control circuit 15 drives the lens drive mechanism 4 so that all or a part of the optical elements of the imaging lens 2 are reciprocated in the optical axial direction. The image data obtained by the imaging device 3 is processed and it is determined that the state where contrast is maximized is the state where an image of the object is focused, that is, formed on the light receiving surface of the imaging device 3. The AF sensor is not limited to this specific example and it is possible to use various methods such as an active method of irradiating the object with infrared rays or the like and detecting light reflected from the object and a passive method of using the principle of so-called triangulation.

The shutter switch 11 is a single-stage switch which is turned on when a user presses up to a predetermined stroke with his/her finger and is turned off when the user takes the finger off. The mode changeover switch 12 can switch among an imaging mode of taking an image with the digital still camera 1, a playback mode of displaying the image on the display device 8 using image data stored in the memory card 16 and a data editing mode of writing predetermined data on the taken image using a PictBridge function or the like. In the imaging mode, it is possible to switch between a normal imaging mode of automatically emitting flash light as necessary and an automatic imaging mode. The normal imaging mode is an imaging mode suitable for the user who is familiar to the operation of the digital still camera 1 and the automatic imaging mode is an imaging mode suitable for the user who is unfamiliar to the operation of the digital still camera 1.

Figure 3:
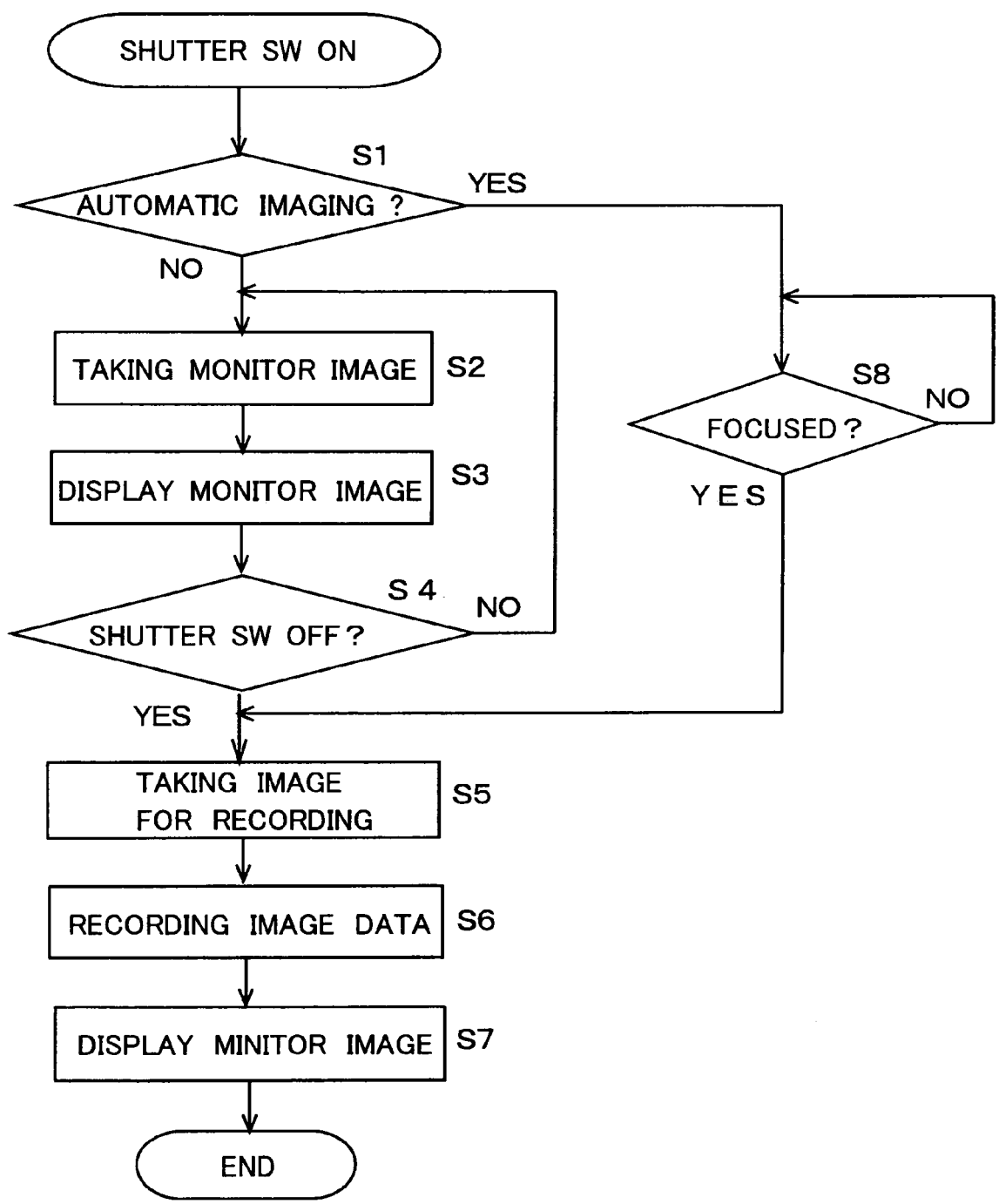
FIG. 3 is a flowchart showing an operation in an imaging mode in the first embodiment.

FIG. 3 is a flowchart showing the imaging mode of the digital still camera 1. When a main switch of the digital still camera 1 is turned on and the normal imaging mode or automatic imaging mode is selected, the image is displayed on the display device 8 using the image data output from the imaging device 3. However, the lens drive mechanism 4 is not driven and thus the image is usually out of focus.

In the normal imaging mode (NO at S1), the control circuit 15 controls the lens drive mechanism 4, the light amount adjustment mechanism 6 and the imaging device 3 under a state that the shutter switch 11 is turned on by the user, takes an image for monitoring at a predetermined interval (S2) and displays the image on the display device 8 as an electronic view finder using the image data output from imaging device 3 (S3). Then, when the shutter switch 11 is turned off (YES at S4), the control circuit 15 controls the lens drive mechanism 4, the light amount adjustment mechanism 6, the flash unit 7 and the imaging device 3, takes an image for recording (S5), records the image data output from the imaging device 3 in the memory card 16 (S6) and displays the taken image on the display device 8 using the image data (S7).

In the normal imaging mode, since the image for recording is taken when the user takes his/her finger off the shutter switch, the direction of moving the finger becomes opposite compared to a conventional digital still camera which takes an image for recording when the shutter switch is pressed as far as it will go. Thus, since the force to rotate the digital still camera 1 around the optical axis of the imaging lens 2 does not work, the possibility that the digital still camera is moved due to the user's operation of pressing the shutter switch can be reduced.

On the other hand, in the automatic imaging mode (YES at S1), when the shutter switch 11 is turned on, the control circuit 15 controls the lens drive mechanism 4 and the imaging device 3 and waits until the image taken by the imaging lens 2 is formed on the light receiving surface of the imaging device 3 (S8). When the image taken by the imaging lens 2 is formed on the light receiving surface of the imaging device 3, the control circuit 15 controls the light amount adjustment mechanism 6, the flash unit 7 and the imaging device 3, takes the image for recording (S5), records the image data output from the imaging device 3 in the memory card 16 (S6) and displays the taken image on the display-device 8 using the image data (S7).

As mentioned above, in the automatic imaging mode, irrespective of the operation of taking a finger off the shutter switch 11, the image for recording is automatically taken at time of focusing of the image. Thus, it is possible to reduce the possibility that the user who is unfamiliar to the operation of taking the image for recording by taking his/her finger off the shutter switch 11 may fail to perform imaging.

Hereupon, the reason why the possibility of hand movement is reduced by taking the image for recording when the user takes his/her finger off the shutter switch will be considered below.

In almost all of the conventional digital still cameras, a two-stage switch comprised of a first switch as the shutter switch which is turned on when the user lightly puts his/her finger thereon and a second switch which is turned on when the user deeply presses up to a predetermined stroke is used. When the first switch is turned on, the lens drive mechanism and the like are controlled to take the image for monitoring, and when the second switch is turned on, the image for recording is taken. The direction of pressing the shutter switch is the direction perpendicularly to the optical axis of the imaging lens. Thus, when the user deeply presses the shutter switch to turn on the second switch for taking the image for recording, the force is applied to the main body so as to rotate the main body around the optical axis of the imaging lens in a clockwise direction viewed from the user. At this time, if the user does not firmly hold the main body or if the exposure time of the imaging device is longer, the main body rotates with respect to the object and thus the image formed on the imaging device rotates, resulting in blurring of the image taken by the imaging device 3.

On the contrary, if the image for recording is taken when the user takes his/her finger off the shutter switch 1, that is, the shutter switch 11 is turned off as in the digital still camera 1 in accordance with the first embodiment, the force to rotate the main body 10 around the optical axis of the imaging lens 2 is not applied to the main body 10, thereby reducing the possibility of causing the movement of the digital still camera while the image is taken by the imaging device 3.

Second Embodiment

Subsequently, a digital still camera 1 in accordance with a second embodiment of the present invention will be described. Since the hardware configuration of the digital still camera 1 in accordance with the second embodiment is basically the same as that of the first embodiment, description thereof is omitted.

As mentioned above, various users use the digital still camera 1. Therefore, in the above-mentioned first embodiment, the normal imaging mode for the user who is familiar to the operation of taking the image for recording by taking his/her finger off the shutter switch 11 and the automatic imaging mode for the user who is unfamiliar to the operation are prepared. In the second embodiment, a single imaging mode is configured to be suitable for all users.

As mentioned above, almost all of the conventional digital still cameras take the image by pressing the shutter switch. Thus, not a few users recognize that the image is taken when the shutter switch is pressed. Thus, the user may put his/her finger on the shutter switch all the time or take his/her finger off the shutter switch while moving the main body. In these cases, the user cannot obtain the desired image, resulting in failure of imaging. Thus, in the second embodiment, the image for recording is not taken by taking the user's finger off the shutter switch 11. Instead, the image data which is obtained while the shutter switch 11 is turned on and temporarily stored in the RAM is decided as the image data for recording at the time when the user takes his/her finger off the shutter switch 11, and the decided image data is recorded in the memory card 16.

Figure 4:
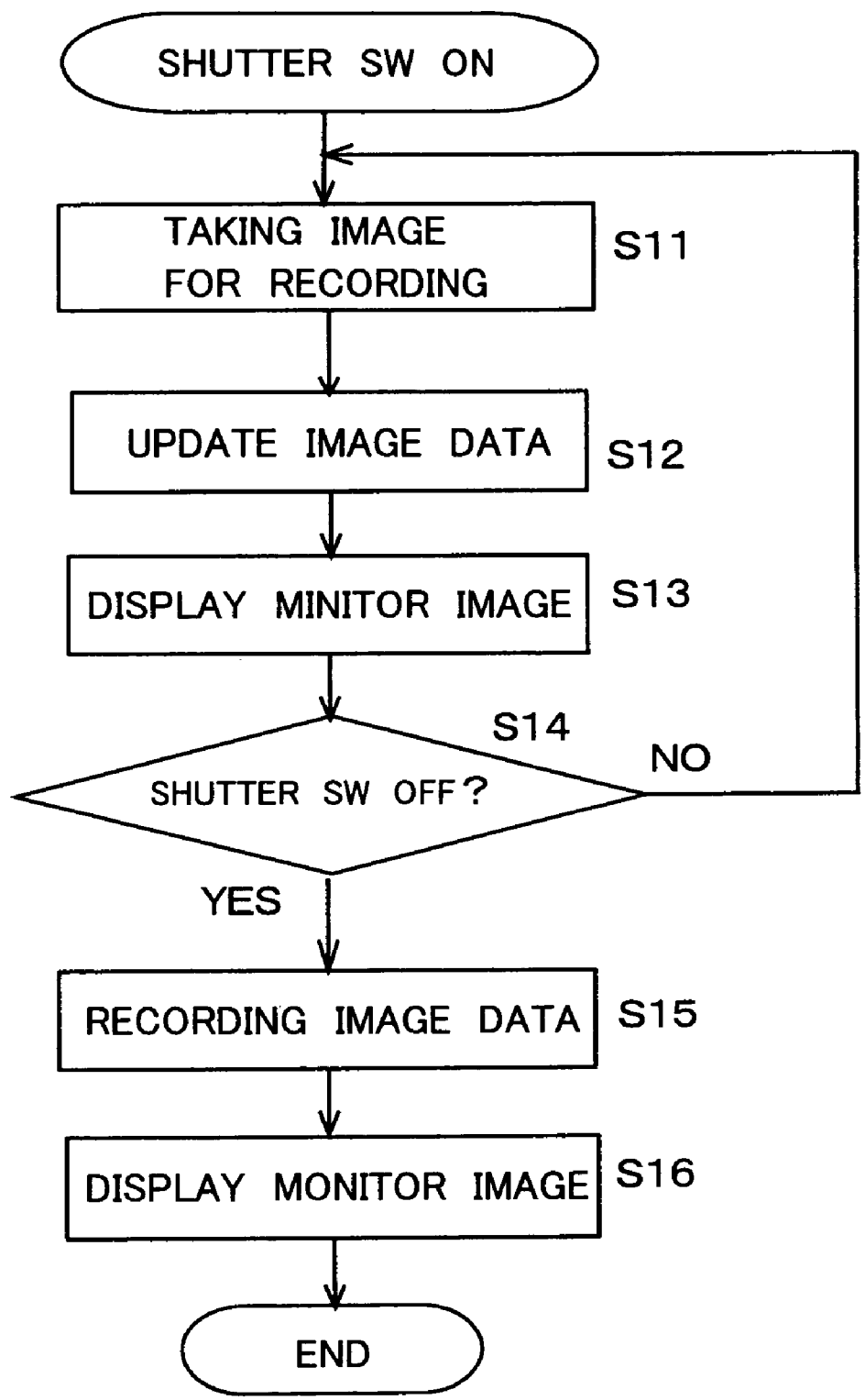
FIG. 4 is a flowchart showing an operation in an imaging mode in a second embodiment of the present invention.

FIG. 4 is a flowchart showing the imaging mode of the digital still camera 1 in accordance with the second embodiment. When the user turns on the shutter switch 11, the control circuit 15 controls the lens drive mechanism 4, the light amount adjustment mechanism 6 and the imaging device 3, takes the image for recording (S11) and temporarily stores the image in the RAM of the control circuit 15. When image data is already stored in the RAM, the old image data is deleted and image data is updated (S12). In parallel with this, the image is displayed on the display device 8 as the electronic view finder using the updated image data (S13). When the shutter switch 11 is not turned off (NO at S14), the operation returns to the step S11 and an image for recording is newly taken. When the shutter switch 11 is turned off (YES at S14), the image data stored in the RAM just before the turn-off is recorded in the memory card 16 as the image data for recording (S15) and the taken image is displayed on the display device 8 using the image data (S16).

As described above, in the second embodiment, the user who is familiar to the operation of taking the image for recording by taking the user's finger off the shutter switch would move his/her finger off the shutter switch as soon as he/she can get a favorite composition. Even the user who is unfamiliar to the operation can take an image as in the case of using the conventional digital still camera, thereby reducing the possibility of failing to take the image.

Since a capacitor needs to be charged to emit flash light when the brightness of the object is low and thus flash light is required, it is difficult to take an image at short intervals. Furthermore, it is unnatural that flash light is emitted repeatedly in the state where the user holds the digital still camera toward the object. Thus, when flash light is required, flash light is automatically emitted only once at the time when the capacitor has been charged and the image at the time may be used as the image for recording. At this time, since the user recognizes that imaging is completed by emission of flash light, there is little uncomfortable feeling.

This application is based on Japanese patent application 2004-237713 filed Aug. 17, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A digital still camera comprising: an imaging lens; an imaging device arranged so as to be perpendicular to an optical axis of the imaging lens; a focus means for driving the imaging lens in a forward-rearward direction of the optical axis so as to form an image taken by the imaging lens on a light receiving surface of the imaging device; an exposure adjustment means for adjusting an amount of transmitted light of the imaging lens and/or an imaging time of the imaging device depending on a brightness of an object; a storage means for storing an image data taken by the imaging device; a display device for displaying an image taken by the imaging device; a control means for controlling the imaging lens, the imaging device, the focus means, the exposure adjustment means, the storage means and the display device; a flash light-emission means for emitting flash light when the brightness of the object is low; and a shutter switch operated by a user; wherein the shutter switch is a single-stage switch which is turned on when the user presses the shutter switch to a predetermined stroke position with his/her finger toward a main body of the digital still camera and is turned off when the user takes his/her finger off the shutter switch at the predetermined stroke position in a direction away from the main body;

in a state where the shutter switch is turned on, the control means controls the focus means, the exposure adjustment means and the imaging device to takes an image for monitoring at a predetermined interval and display an image on the display device using an image data output from the imaging device;

when the shutter switch is turned off from the state in which the shutter switch is turned on, the control means controls the focus means, the exposure adjustment means, the flash light-emission means and the imaging device to take an the monitored image for recording, stores the image data output from the imaging device in the storage means and displays the taken image on the display device using the image data.

2. A digital still camera comprising: an imaging lens; an imaging device arranged so as to be perpendicular to an optical axis of the imaging lens; a focus means for driving the imaging lens in a forward-rearward direction of the optical axis so as to form an image taken by the imaging lens on a light receiving surface of the imaging device; an exposure adjustment means for adjusting an amount of transmitted light of the imaging lens and/or an imaging time of the imaging device depending on a brightness of an object; a storage means for storing an image data taken by the imaging device; a display device for displaying an image taken by the imaging device; a control means for controlling the imaging lens, the imaging device, the focus means, the exposure adjustment means, the storage means and the display device; and a shutter switch operated by the user; wherein the shutter switch is a single-stage switch which is turned on when the user presses the shutter switch to a predetermined stroke position with his/her finger toward a main body of the digital still camera and is turned off when the user takes his/her finger off the shutter switch at the predetermined stroke position in a direction away from the main body;

in a state where the shutter switch is turned on, the control means controls the focus means, the exposure adjustment means and the imaging device, to take an image for monitoring at a predetermined interval, stores an image data output from the imaging device in the storage means, updates old image data and displays the taken image on the display device using image data; and when the shutter switch is turned off from the state that the shutter switch is turned on, the control means records the image data stored in the storage means just before turn-off as an image data for recording and displays the taken image on the display device using the recorded image data.

3. A digital still camera comprising: an imaging lens; an imaging device arranged so as to be perpendicular to an optical axis of the imaging lens; a focus means for driving the imaging lens in a forward-rearward direction of the optical axis so as to form an image taken by the imaging lens on a light receiving surface of the imaging device; an exposure adjustment means for adjusting an amount of transmitted light of the imaging lens and/or an imaging time of the imaging device depending on a brightness of an object; a storage means for storing an image data taken by the imaging device; a display device for displaying an image taken by the imaging device thereon; a control means for controlling the imaging lens, the imaging device, the focus means, the exposure adjustment means, the storage means and the display device; a flash light-emission means for emitting flash light when the brightness of the object is low; and a shutter switch operated by the user;

the shutter switch is a single-stage switch which is turned on when the user presses the shutter switch to a predetermined stroke position with his/her finger toward a main body of the digital still camera and is turned off when the user takes his/her finger off the shutter switch at the redetermined stroke position in a direction away from the main body;

in a normal imaging mode, in a state where the shutter switch is turned on, the control means controls the focus means, the exposure adjustment means and the imaging device to take an image for monitoring at a predetermined interval and displays an image on the display device using an image data output from the imaging device; and when the shutter switch is turned off from the state that the shutter switch is turned on the control means controls the focus means, the exposure adjustment means, the flash light-emission means and the imaging device to take the monitored image for recording, stores the image data output from the imaging device in the storage means and displays the taken image on the display device using the image data;

in an automatic imaging mode, when the shutter switch is turned on, the control means controls the focus means, and at the time when the image taken by the imaging lens is formed on a light receiving surface of the imaging device, controls the exposure adjustment means or the flash light-emission means and the imaging device to take the image for recording, stores the image data output from the imaging device in the storage means and displays the taken image on the display device using the image data; and the possibility of movement of the digital still camera due to the user's operation of pressing the shutter switch is reduced.

* * * * *

UNITED STATES PATENT AND TRADEMARK OFFICE
CERTIFICATE OF CORRECTION

PATENT NO. : 7,580,056 B2
APPLICATION NO. : 11/204103
DATED : August 25, 2009
INVENTOR(S) : Toshikatsu Tsukamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Fourteenth Day of September, 2010

David J. Kappos
*Director of the United States Patent and Trademark Office*